Figure 1:
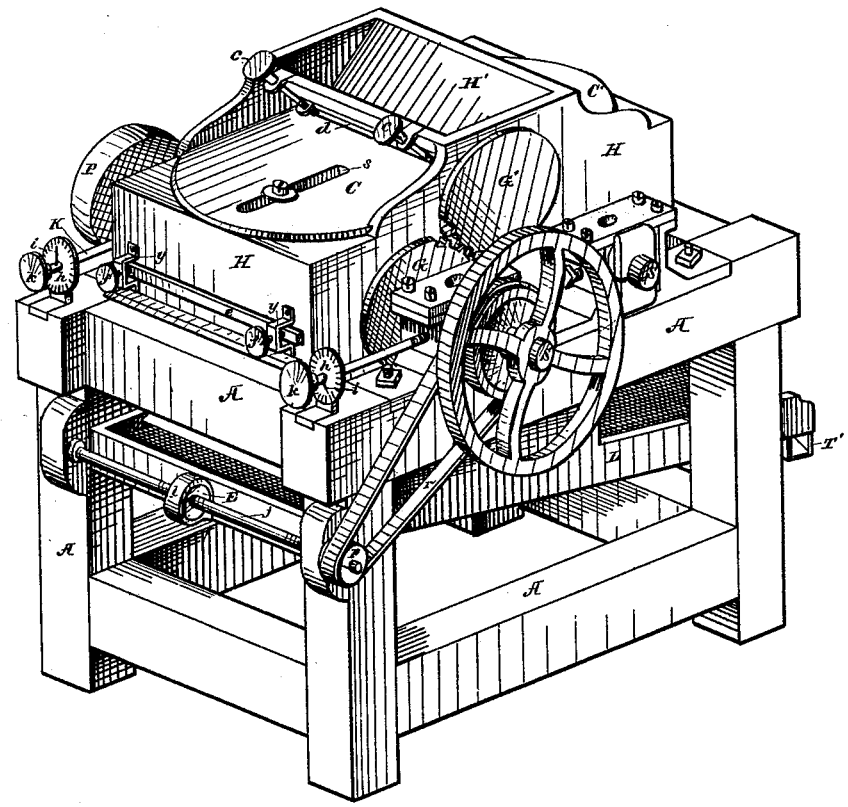

4 Sheets—Sheet 1.

T. WALLACE.
Process of and Apparatus for Making Middlings from Grain.

No. 220,950. Patented Oct. 28, 1879.

WITNESSES
James P. Mallette
P. E. Brookey

INVENTOR
Thomas Wallace.
Per M. E. Dayton
Attorney

4 Sheets—Sheet 2.
T. WALLACE.
Process of and Apparatus for Making Middlings from Grain.
No. 220,950. Patented Oct. 28, 1879.
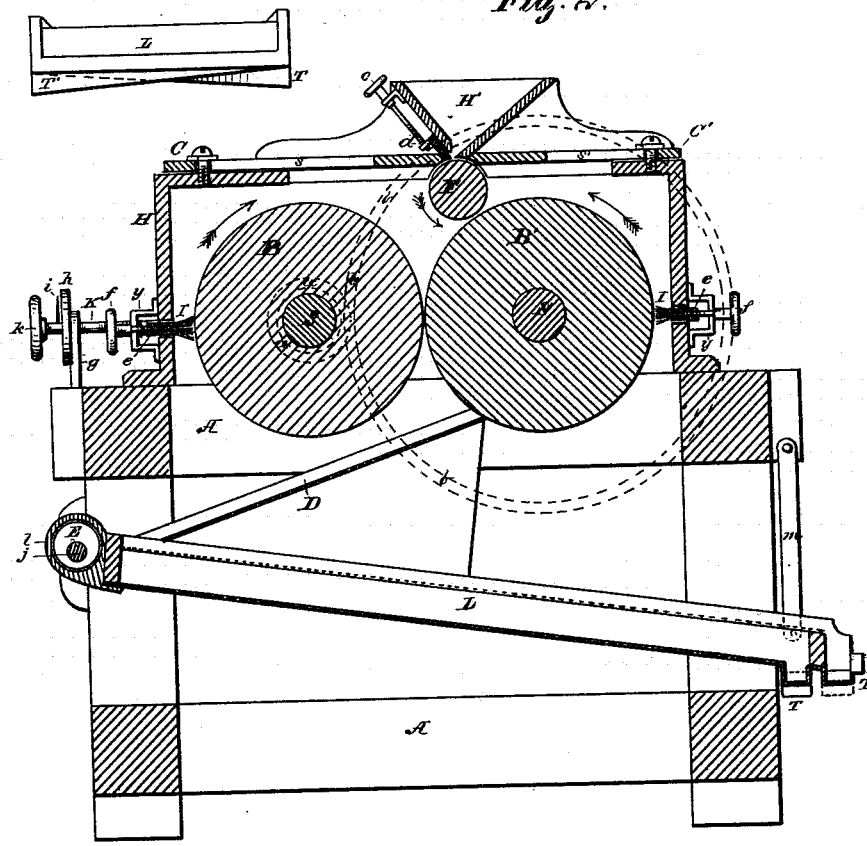
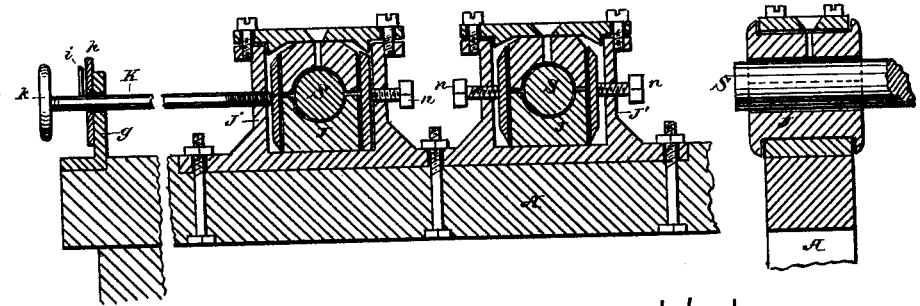
WITNESSES
James P. Mallette
P. E. Brooksey
INVENTOR
Thomas Wallace.
Per M. E. Dayton
Attorney.

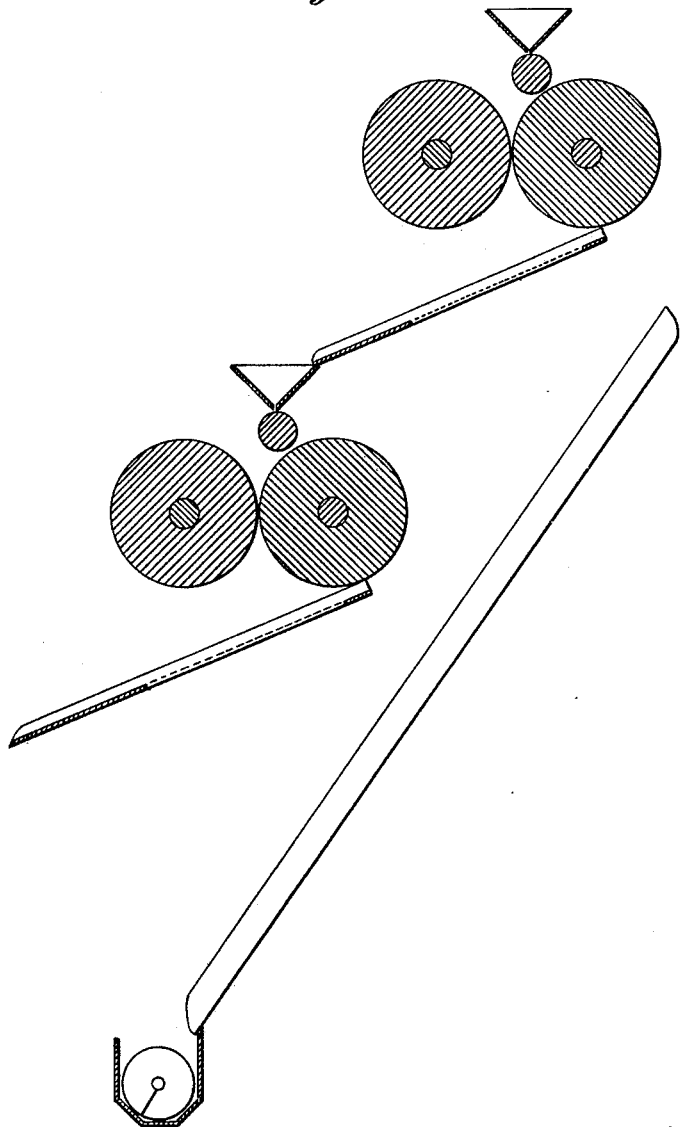

4 Sheets—Sheet 4.

T. WALLACE.
Process of and Apparatus for Making Middlings from Grain.

No. 220,950. Patented Oct. 28, 1879.

Witnesses
James P. Mallette
P. Elboorley

Inventor
Thomas Wallace.
Per M. E. Dayton
Attorney.

UNITED STATES PATENT OFFICE.

THOMAS WALLACE, OF JOLIET, ASSIGNOR OF FIVE-SIXTHS OF HIS RIGHT TO WALLACE WARREN, OF CHICAGO, ILLINOIS, AND NATHAN P. CURRIER, J. CARL JACKSON, AMBROSE S. BEVERLY, AND WILLIAM S. CAMP, OF LOCKPORT, NEW YORK.

IMPROVEMENT IN PROCESSES OF AND APPARATUS FOR MAKING MIDDLINGS FROM GRAIN.

Specification forming part of Letters Patent No. 220,950, dated October 28, 1879; application filed January 20, 1879.

*To all whom it may concern:*

Be it known that I, THOMAS WALLACE, of Joliet, in the State of Illinois, have invented certain new and useful Improvements in Methods and Apparatus for Making Middlings from Grain; and I do hereby declare that the following is a full, clear, and exact description thereof, reference being had to the accompanying drawings, and to the letters of reference marked thereon, which form a part of this specification.

In the manufacture of flour from cereal grains by the older processes, it was sought to accomplish the result by a single operation of grinding. The grain was therefore subjected to the grinding action so long as to be heated, and thereby materially injured, and a considerable portion of the bran integument was comminuted to the same degree of fineness with the flour, so as to be inseparable therefrom. This comminuted bran imparted an objectionable color to the flour and its products. The more approved of modern methods have sought to remedy these evils by gradual reduction of the grain, or repeated and less severe grindings. By these methods the heating of the products is largely obviated, and a lessened but still considerable comminution of the bran is effected.

Special expensive and troublesome methods and appliances have been employed for separating the comminuted bran from the reduced grain substance. These are not wholly effective in accomplishing the end sought.

The process of gradual reduction, so called, has led to the production of those coarser granulations of the interior substance of grain known as "middlings" as a distinct preliminary product in the manufacture of flour.

My invention relates to a process and apparatus for the production of middlings. Its principal objects are, first, to produce more general granulation and less pulverization of the food substance, or, in other words, a larger proportion of middlings and a less proportion of flour. This I accomplish by first crushing the grain, which breaks down its granular structure without pulverizing it, and then rasping or grating off the loosened granules from the bran flattened into a sheet in the operation of crushing. Second, the removal of the food substance from the integument or bran in granular form without serious comminution of the bran. This I accomplish by means of two sharply-rough or granular surfaces, arranged opposite each other, one of which embeds itself in the integument of a grain fragment, and thereby fixedly holds the same while the opposite surface grates or rasps off the food substance of the berry without coming in contact with the bran integument.

To these ends my process consists in passing the grain, either once or more than once, between two surfaces, each having a peculiar sharply-rough or granular structure capable of embedding itself in the bran surface of a grain fragment, so as to hold the same fixedly, as described, while the opposite similar surface grates off the food substance.

My apparatus consists in the devices, substantially as herein described, and shown in the accompanying drawings, whereby my process may be effected.

The principal features of my apparatus may be more particularly stated to consist in two cylinders set, or adapted to be set, parallel and as close to each other as may be desired, and not in contact, having their surfaces of granular, crystalline, or other form of sharp roughness equivalent thereto for their purpose in this machine, and so connected or adapted to be driven as to rotate inwardly and downwardly toward their proximate line at materially unequal velocities.

Figure 7:
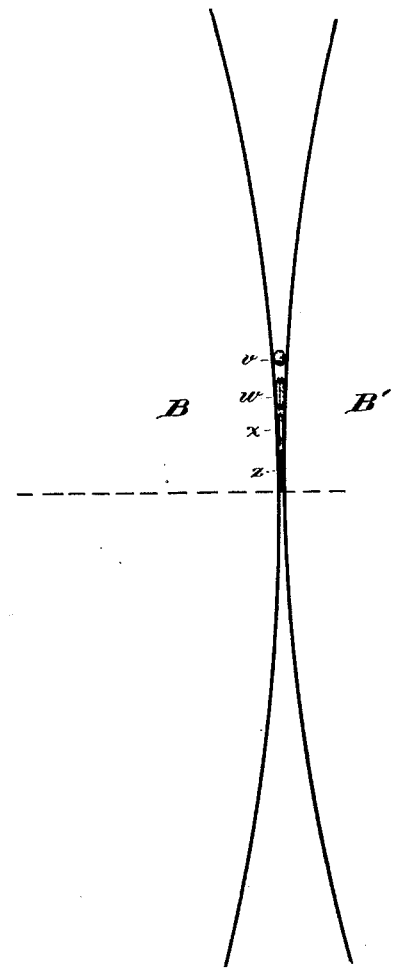

Figure 1 is a perspective view of a cylinder-mill embodying my invention so far as the same is contained in an apparatus having a single pair of cylinders. Fig. 2 is a central vertical section of the same transverse to the axes of the cylinders. Figs. 3, 4, and 5 are details of the machine, and Fig. 6 shows a vertical arrangement of a series of mills. Fig. 7 illustrates the mode of action of said mill upon a kernel of wheat in the process of its reduction from whole grain to middlings and bran.

A A is a suitably-strong frame, upon which are mounted the cylinders B and B' by means of their central shafts, S, which having bearings in the boxes J. These boxes are adapted to slide a short distance in the bed-pieces formed of the preferably-continuous castings J' for the purpose of adjustment.

Set-screws $n$ $n$ serve to adjust and hold the bearing-boxes J of the cylinder B', which, when once fixed, are intended to remain stationary. The set-screws $n'$ and K in like manner serve to adjust the position of the cylinder B, which is intended to closely proximate, but to never touch, the opposite cylinder, B'.

For the purpose of nice and positive adjustment of the cylinders, or of the space between them, the screw-shaft K is provided with the pointer $i$, and at the rear of this pointer is located the graduated dial $h$, embracing the shaft and secured to the frame, as shown in Figs. 1, 2, and 4.

H is a hood covering both cylinders and resting securely upon the frame A. It is provided with the hopper H', which has the feed-slide $d$, adjusted by means of the screws $c$ $c$.

F is the feed-roll, arranged to rotate beneath the hopper H' and slide $d$ in the usual manner, and operated by the gear-wheels G and G', or otherwise, to feed the grain directly between the cylinders B and B'.

P is a drive-pulley fixed to one of the shafts S, and gear-wheels (indicated by dotted lines $a$ and $b$, Fig. 2) communicate motion from one cylinder-shaft to the other. The cylinders are rotated downwardly and inwardly toward each other, or in the direction of the falling grain.

I I are brushes arranged to bear upon the cylinders along their entire length for the purpose of detaching any bran or other material that may adhere to them. These brushes may be in cylindric form and rotated against the surfaces of B and B', and they may, perhaps, better be located beneath said cylinders. The brushes shown are adjusted to bear against B and B' more or less forcibly by means of the set-screws $f$, which work in the yokes $y$ and enter the movable heads $e$ of said brushes.

C C are sliding covers arranged upon the hood H, by which access may be had to the cylinders B and B' and the feed-roller F without disturbing the hood. These covers are herein shown to be secured by means of set-screws working in slots $s$.

L is an inclined screen arranged beneath the cylinders and supported by the links $m$ and loop $l$. It is actuated by the eccentric E, fixed to the shaft $j$, and rotated within the loop $l$.

The chute D receives the product of the cylinders and carries it to the head of the screen, and the separated portions of the product emerge at T and T'.

The gear-wheels, by which the cylinders B and B' are connected are herein indicated by the dotted lines $a$ and $b$ to have their diameters in about the ratio of five to one. As a consequence, the equal cylinders shown will have their velocities in the same ratio. This difference in the velocities of the surfaces is not given as necessarily better than any other, and especially is not intended to fix the meaning of my claim. The feature of relative difference in surface speed for the cylinders will be hereinafter more fully explained.

The operation of my machine is substantially as illustrated in Fig. 7 of the drawings, and as generally described below, B being the faster cylinder, and B' the slower.

First, a kernel of wheat let fall between the cylinders B and B' is seized, say, at the point $v$, and the prominences of each rough cylinder surface begin at once to embed themselves in its integument. Since both surfaces move in the same direction the grain is quickly brought (with or without some rotation on its axis, according to its position when seized) to, say, the point $w$. Here it is so compressed that the integument is ruptured, the rupture being usually in a vertical direction, practically dividing the grain into two parts or fragments. The prominences of the rough cylinder-surfaces being now more numerously and more deeply impressed into the integument, each fragment of the ruptured grain will adhere as against lateral force to the adjacent cylinder by its bran-surface.

Second, as the cylinder-surfaces have unequal velocities, the fragments adhering severally thereto are separated, that fragment adhering to the faster cylinder, B, being slid off the other and carried to, say, the point $z$, while that adhering to the slower cylinder, B', is only carried to the point $x$.

Third, since the advancing surfaces approach, as soon as the parts of the grain are separated the free surface of each one is borne against the opposite cylinder, by which the food substance is gradually stripped off in the desired form of coarse sharp granulations. This action will obviously be more or less complete according to the distance between the cylinders at their point of nearest approach. As the fragments advance between the proximating surfaces they are more and more flattened or spread out upon the cylinders, so that if the latter be properly set for the purpose neither part of the bran will encounter the opposite cylinder, and no pulverization thereof will take place in its passage between the two.

Fourth, since both cylinder-surfaces are in motion in the same downward direction, each part of the grain is steadily carried forward by positive and determinate action of the machine and is shortly discharged, wherefore, and also because the cylinders do not touch, the product obviously need not be heated or injured in the operation.

The food substance detached from the bran in the operation above described is, mainly, composed of coarse and comparatively uniform granulations or middlings. A small percentage of flour is also unavoidably produced; but the product is almost wholly free from pulverized or comminuted bran, and is in other respects of superior quality and condition.

In the foregoing description a single grain of wheat, whole when admitted, has been traced in a single passage between the cylinders. Said description will also serve for the general practical working of the mill. Slight variations may take place as to some portion of the grain fed in quantity—as, for example, when grains enter so close to each other as to interfere somewhat in spreading upon the cylinders. To prevent this I employ a feed-roll, F, arranged in the usual manner, as shown, beneath the hopper H', provided with the adjustable slide $d$. By this means the grains or fragments may be fed to the cylinders at such distance apart as not to interfere materially to prevent their proper expansion upon the cylinder-surfaces.

The feed device may also be made, if desired, to determine the axial direction in which the several grains shall be received between the surfaces.

Said description will equally serve to make plain the action of the cylinder-surfaces (having the relative motion described) upon grain either simply crushed or in separated fragments when fed to the mill. Flattened grains or fragments naturally enter edgewise between the cylinders, and they are seized and held by impression of the rough surfaces upon their bran portion, and overlying fragments are separated and stripped in the same manner as when the grain is admitted whole and crushed in the same passage. Since the cylinders will thus properly act upon grain previously ruptured and even separated, it follows that the stripping process need not be confined to a single operation—that is to say, the same grain fragments may, if desired, be repeatedly passed between stripping-cylinders for the purpose of denuding the bran. The results are often better if this is done.

While the same cylinders may be employed for successive strippings, being set closer for each succeeding passage, I prefer to use a series of mills, arranged in either vertical or horizontal order, with appliances for conveying material from one mill to another and suitable screens or bolts for separating and withdrawing the middlings and flour after each operation.

The screens or bolts may be made to serve also as conveyers, as shown in Fig. 6, which shows a series of mills arranged in vertical order, the middlings and flour being withdrawn and the partially-denuded bran being discharged into the hopper of a succeeding mill.

As to the nature of the cylinder-surfaces employed in my process and apparatus, they meet the requirements of my invention, so far as structure is concerned, if they are adapted to hold the grain fragments by impression upon the integument or bran.

The required surface may be artificially produced by a composition of sharp angular fragments or grains of any suitable substance— say of silicious sand, emery, or corundum, of No. 40 or thereabout, as known in the trade— united to a matrix of some proper cementing substance, molded in cylindrical form, and finally trued upon the lathe with a diamond or other proper tool. The matrix, being softer than the embedded grains, will wear away and expose the angular points of the embedded grains until said points by their protrusion protect the matrix from further attrition. This character of the surface will be preserved indefinitely, and when, in the course of time, the roller has ceased to be truly cylindrical, its truth may be restored by redressing, as at first.

Rollers possessing the required characteristics may be made also of marble and sandstone, or of any substance of continuously-close texture which, in dressing by the diamond or other suitable material, will continually preserve a surface of angular fracture or cleavage, more or less fine, according as the tool is set to deep or light cut. Marble, however, does not appear to possess sufficient endurance to make its use advantageous for this purpose.

The required characteristic of surface may also be produced by sand-blast upon substances not otherwise capable of assuming the same, such as porcelain, steel, &c., and I therefore do not propose to limit myself to the use of any particular substance or material.

In both cylinders the surface must be continuously of the character set forth, since at any point it may be required to either impress and hold a fragment or strip one held by the cylinder opposite.

In a series of mills for the successive passage and stripping of the same grain, as described, the cylinder-surfaces may be varied in fineness, if desired.

Concerning the degree of difference in velocity between the cylinder-surfaces, it is clear that it must be such as will effect the separation of opposite or overlying fragments between the points $w$ and $z$, Fig. 7. This distance will, obviously, vary with the diameter of the cylinders. In the case of cylinders eighteen inches in diameter comparatively uniform results are obtained by differences varying from two to one to six to one, and less satisfactory results are obtained when the difference is outside these ratios. Within practicable limits the relative velocities may be advantageously varied with reference to the kind and condition of the grain to be reduced and to the special results sought to be obtained. The operation of the mill in these respects will be readily observed by the skilled miller, who should have change-gears, by which the relative speeds may be conveniently altered at will.

The faster cylinder may be advantageously run at a surface-speed of about eight hundred feet per minute.

In the foregoing description of apparatus I have specified cylinders or cylindric surfaces as the agents in the principal step of my process. Cylinders are, doubtless, best adapted to effect said process, besides being the most simple and convenient form in which the desired relations of the acting surfaces may be obtained. An operative mill may, however, be made by arranging a disk to rotate in a vertical plane in proximity to a cylinder placed horizontally opposite the downward-moving face of the disk. The practical objections to this form of device are obvious; but it may be made to embody the general conditions of my process and apparatus, and therefore to fall within my invention.

I am aware that middlings have heretofore been reduced to flour by the action of porcelain rollers revolving at different speeds; but such rollers have been dressed with smooth surfaces, and were therefore incapable of the action herein described and claimed as my process.

Having thus described my invention, I claim and desire to secure by Letters Patent—

1. The method or process of making middlings from grain—namely, by first crushing the grain, so as to break down the interior structure and flatten the bran into sheets, and subsequently grating off the interior substance from the bran-sheets while the fragments are fixedly held by their bran-surfaces, substantially as described.

2. In an apparatus for the production of middlings from grain, the cylinders B and B', adapted to be set close to each other and not to touch, each having a continuous and sharply rough or granular surface capable of embedding itself in the bran-surface of a grain-fragment, as set forth, and so connected as to rotate inwardly and downwardly toward their proximate line at materially unequal velocities, whereby grain admitted between them will be ruptured and fragments will be held by their bran-surfaces and separated from each other and stripped of the adhering food substance, substantially as described.

In testimony that I claim the foregoing as my invention I affix my signature in presence of two witnesses.

THOMAS WALLACE.

Witnesses:
W. WARREN,
GEORGE L. FORD, Jr.